United States Patent … Kaneda

(10) Patent No.: US 9,606,369 B2
(45) Date of Patent: Mar. 28, 2017

(54) DISPLAY APPARATUS

(71) Applicant: Sony Corporation, Tokyo (JP)

(72) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 14/046,546

(22) Filed: Oct. 4, 2013

(65) Prior Publication Data

US 2014/0104577 A1  Apr. 17, 2014

(30) Foreign Application Priority Data

Oct. 17, 2012  (JP) ................................ 2012-229679

(51) Int. Cl.
G02B 27/24 (2006.01)
G03B 21/28 (2006.01)
G02B 27/22 (2006.01)
G03B 35/18 (2006.01)

(52) U.S. Cl.
CPC ......... *G02B 27/24* (2013.01); *G02B 27/2292* (2013.01); *G03B 21/28* (2013.01); *G03B 35/18* (2013.01)

(58) Field of Classification Search
CPC ........ G03B 21/10; G03B 21/14; G03B 21/28; G02B 27/24; G02B 27/2292; H04N 9/31; H04N 9/3147; H04N 13/0003; H04N 13/0007; H04N 13/0011; H04N 13/0014
USPC ............ 353/7, 10, 30, 31, 34, 94, 98, 99, 6; 359/479, 529, 466, 474, 472, 475, 477; 348/42, 51, 52, 54
See application file for complete search history.

(56) References Cited

U.S. PATENT DOCUMENTS

| | | | |
|---|---|---|---|
| 8,007,109 B2* | 8/2011 | Hong | 353/7 |
| 8,446,534 B2* | 5/2013 | Hsieh et al. | 349/5 |
| 2005/0151938 A1* | 7/2005 | Onaga | 353/94 |
| 2008/0266523 A1* | 10/2008 | Otsuka | G02B 27/2285 353/7 |
| 2010/0014053 A1* | 1/2010 | Brentnall et al. | 353/7 |
| 2011/0037952 A1* | 2/2011 | LaDuke | G02B 27/2292 353/28 |
| 2012/0120353 A1* | 5/2012 | Hsieh | G09F 9/35 349/113 |
| 2012/0236269 A1* | 9/2012 | Yoneno | 353/99 |

FOREIGN PATENT DOCUMENTS

| | | |
|---|---|---|
| JP | 2000-092521 | 3/2000 |
| JP | 2008-224748 | 9/2008 |

* cited by examiner

*Primary Examiner* — Christina Riddle
*Assistant Examiner* — Christopher Lamb, II
(74) *Attorney, Agent, or Firm* — Chip Law Group

(57) ABSTRACT

Provided is a display apparatus including: a first display unit including a first screen on which a first image is imaged and that is capable of displaying the first image in a first direction and a first optical member capable of reflecting and displaying the first image in at least one second direction crossing the first direction; a second display unit that includes a second screen on which a second image is imaged and that is capable of displaying the second image in the second direction; and a light source configured to project first image light forming the first image onto the first screen and project second image light forming the second image onto the second screen.

19 Claims, 16 Drawing Sheets

DISPLAY APPARATUS

CROSS REFERENCES TO RELATED APPLICATIONS

The present application claims priority to Japanese Priority Patent Application JP 2012-229679 filed in the Japan Patent Office on Oct. 17, 2012, the entire content of which is hereby incorporated by reference.

BACKGROUND

The present disclosure relates to a display apparatus capable of displaying a virtual image in space.

In recent years, various display apparatuses for displaying stereoscopic images are being developed. For example, Japanese Patent Application Laid-open No. 2000-92521 (hereinafter, referred to as Patent Document 1) discloses a "stereoscopic panoramic image display system" that includes a plurality of cameras arranged to constitute a single 360-degree field of view and is capable of scanning the 360-degree field of view.

Further, Japanese Patent Application Laid-open No. 2008-224748 (hereinafter, referred to as Patent Document 2) discloses a "stereoscopic image display device" including a polygonal pyramid surface on which a plurality of polygonal mirrors are provided and a flat panel display that displays a plurality of plane real images respectively opposing the polygonal mirrors in a ring shape about a center axis of the polygonal pyramid surface. Such a display device enables mirror images of the plane real images obtained by the polygonal mirrors to be viewed from any direction of the polygonal pyramid surface and a stereoscopic image having viewpoints that differ depending on a viewing direction to be provided.

SUMMARY

In the display system disclosed in Patent Document 1, however, images that can be provided to a user are limited to images taken by the cameras. Similarly, in the display device disclosed in Patent Document 2, images that can be provided to a user are limited to images that are displayed on the flat panel display. Therefore, in the structures disclosed in Patent Documents 1 and 2, images that can be provided to a user are limited, and thus it has been difficult to display more complex or expansive information.

In view of the circumstances as described above, there is a need for a display apparatus capable of displaying more complex or expansive information.

According to an embodiment of the present disclosure, there is provided a display apparatus including a first display unit, a second display unit, and a light source.

The first display unit includes a first screen on which a first image is imaged and that is capable of displaying the first image in a first direction and a first optical member capable of reflecting and displaying the first image in at least one second direction crossing the first direction.

The second display unit includes a second screen on which a second image is imaged and is capable of displaying the second image in the second direction.

The light source is configured to project first image light forming the first image onto the first screen and project second image light forming the second image onto the second screen.

In the display apparatus, since the image displayed on the second screen can be provided to a user in addition to the image displayed on the first screen, more complex or expansive information can be provided.

The display apparatus may further include a reflection member configured to reflect the second image light projected from the light source toward the second screen.

With this structure, a degree of freedom in installing the second screen can be raised.

The first optical member may be formed of a translucent material. In this case, the light source may project the second image light onto the second screen via the first optical member.

By forming the first optical member of a translucent material, a virtual image of the first image can be displayed at a back (rear) of the first optical member. In addition, since a part of a path of the second image light can be structured by the first optical member, the degree of freedom in installing the second screen can be raised additionally.

The first optical member may be formed in a pyramid shape including a first apex portion and a plurality of first side surfaces. The first apex portion opposes the first screen in the first direction. The plurality of first side surfaces are capable of reflecting and displaying the first image displayed on the first screen in a plurality of second directions.

With this structure, it becomes possible to form a virtual image of the first image inside the first optical member. According to a type of the first image, it also becomes possible to provide a common image or different images depending on a viewing direction.

The first image may include a plurality of image portions that differ for each of the plurality of first side surfaces. In this case, the plurality of image portions displayed on the first screen are reflected and displayed in the plurality of second directions that differ for each of the plurality of first side surfaces.

With this structure, images that differ for each of the side surfaces of the first optical member can be displayed with ease.

The plurality of image portions may include a plurality of image portions obtained when an object is seen from different viewpoints.

With this structure, a 3D virtual image having viewpoints that differ depending on the viewing direction can be displayed.

The second screen may be constituted of a transmission-type screen.

With this structure, the structure of the second display unit can be simplified, and visibilities of the first and second images can be enhanced.

The first screen may have a screen gain of 5.5 or more.

With this structure, image display of a high luminance can be stably realized, and a real image displayed on the first screen can be made difficult to be seen from the user.

The first optical member may be formed in a hollow shape.

Since goods related to a display image can be accommodated inside the first optical member, by superimposing the first image on the goods, more complex or expansive information can be displayed.

The second display unit may be formed in a translucent pyramid shape including a second apex portion opposing the first apex portion in the first direction and a plurality of second side surfaces connected to the plurality of first side surfaces. In this case, the second screen is constituted of at least one of the plurality of second side surfaces.

With this structure, second images in a common display form or different display forms depending on the viewing direction can be provided.

The second screen may include a light incident surface that the second image light enters and on which an antireflection film is formed.

For example, even when the first image light enters the second optical member, undesired reflection image can be prevented from being formed from the second optical member by the antireflection film.

On the other hand, the second screen may be a reflection-type screen. In this case, the second display unit further includes a second optical member capable of reflecting and displaying the second image in the second direction.

In this case, the second optical member may be formed in a pyramid shape. The pyramid shape includes an apex portion opposing the second screen and a plurality of side surfaces capable of reflecting and displaying the second image displayed on the second screen in the second direction.

The light source may include a projector.

By using a linear property of light of the projector, a plurality of pieces of information can be developed in space at the same time.

As described above, according to the embodiment of the present disclosure, display of complex or expansive information becomes possible.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments of the present disclosure will be described with reference to the drawings.

First Embodiment

Figure 1:
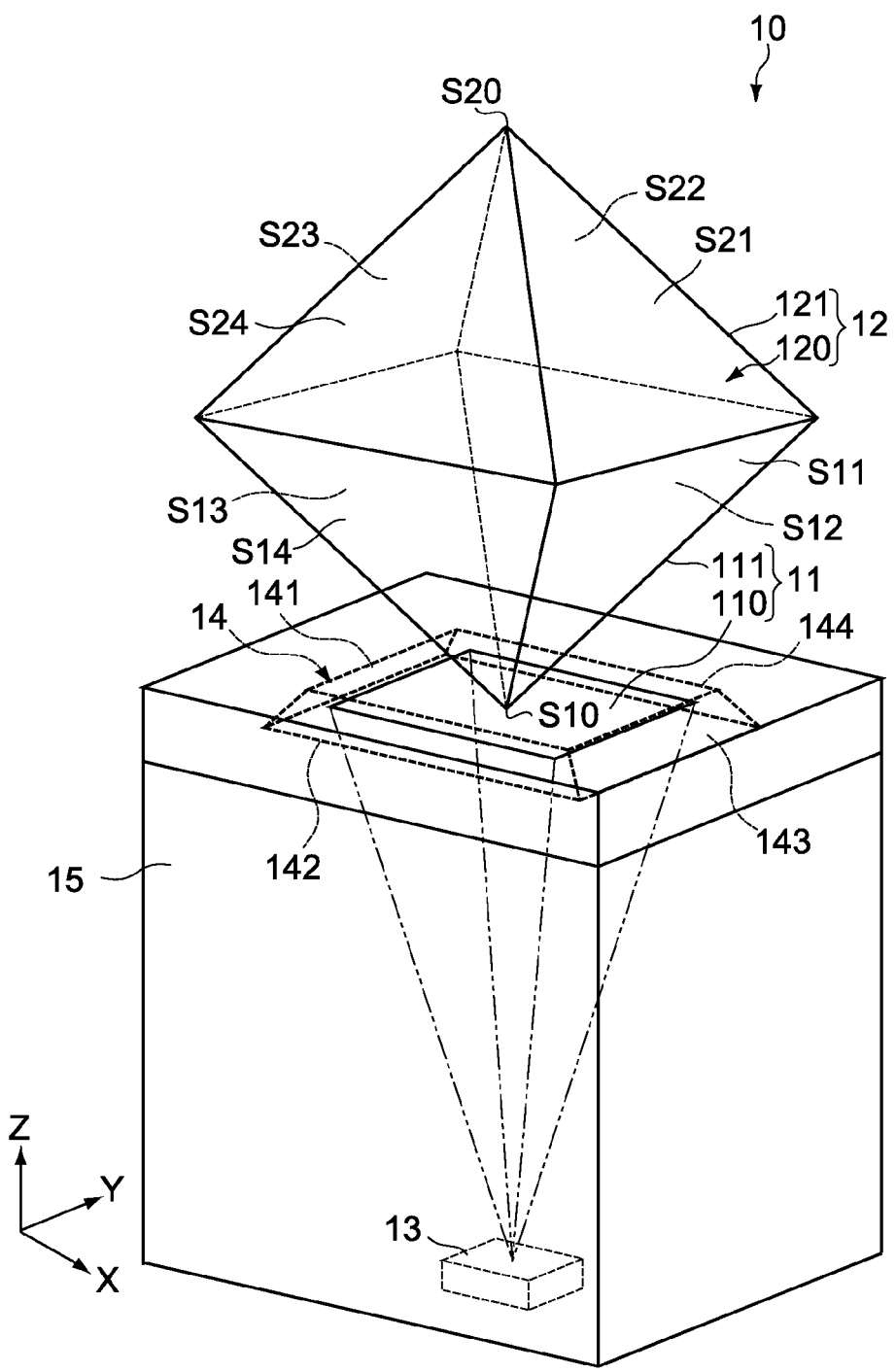
FIG. 1 is a schematic perspective view showing a structure of a display apparatus according to a first embodiment of the present disclosure.
Figure 2:
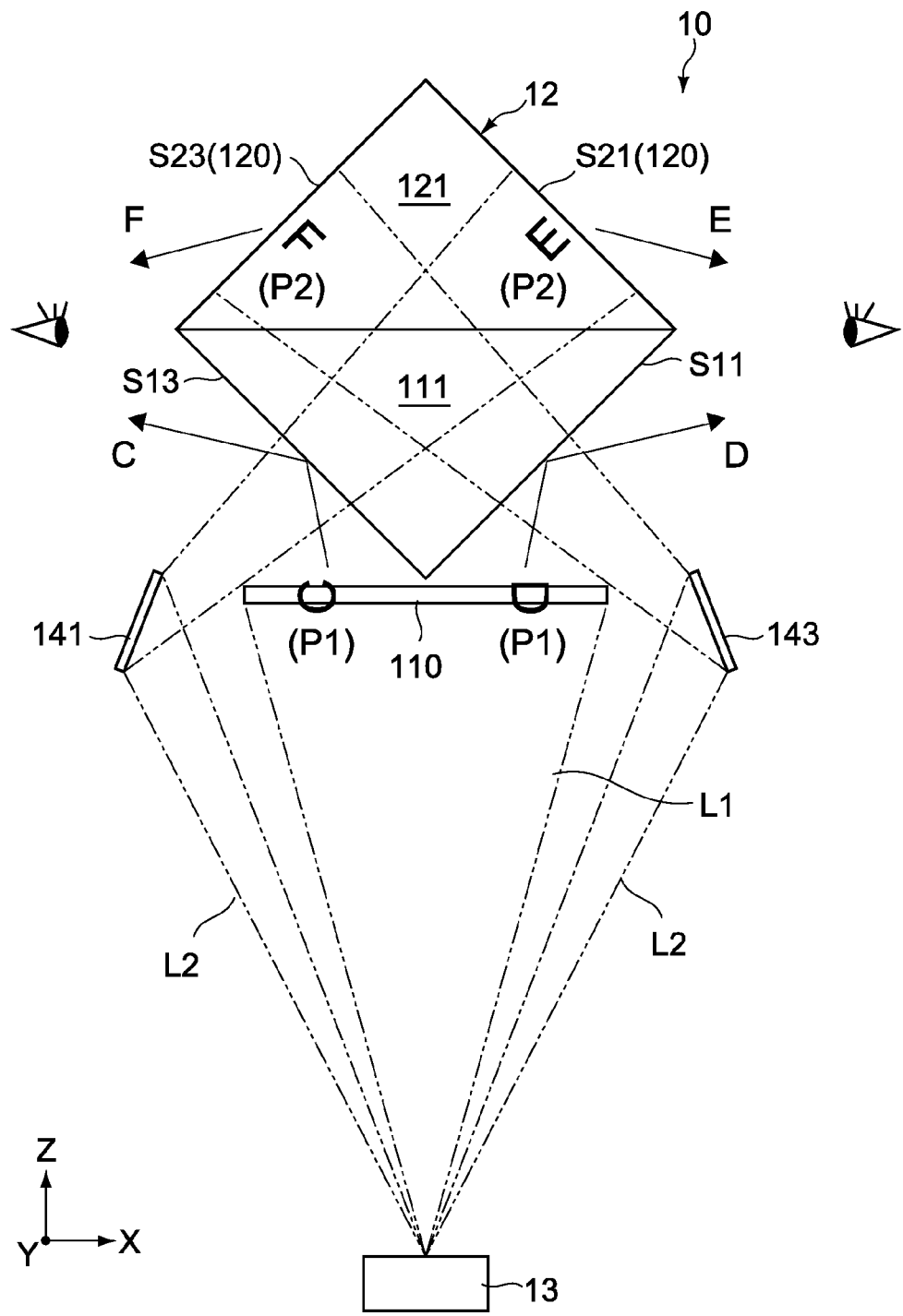
FIG. 2 is a schematic side view showing the structure of the display apparatus.

FIG. 1 is a schematic perspective view showing a structure of a display apparatus according to a first embodiment of the present disclosure. FIG. 2 is a schematic side view showing the structure of the display apparatus. In the figures, X, Y, and Z axes indicate mutually-orthogonal triaxial directions, and the Z axis indicates a vertical direction (height direction).

(Overall Structure)

A display apparatus 10 of this embodiment includes a first display unit 11, a second display unit 12, and a light source 13.

The first display unit 11 includes a first screen 110 and a first optical member 111. A first image P1 is imaged on the first screen 110 that is capable of displaying the first image P1 in a first direction (longitudinal direction (Z-axis direction) in this embodiment). The first optical member 111 is capable of reflecting the first image P1 in a second direction (horizontal direction (X- and Y-axis directions) in this embodiment) crossing the first direction.

The second display unit 12 includes a second screen 120 on which a second image P2 is imaged and is capable of displaying the second image P2 in the second direction.

The light source 13 projects first image light L1 forming the first image P1 onto the first screen 110 and second image light L2 forming the second image P2 onto the second screen 120.

(First Display Unit)

The first display unit 11 includes the first screen 110 and the first optical member 111.

The first screen 110 is parallel to an XY plane. The first image P1 is formed by projecting the first image light L1 from the light source 13 onto the first screen 110. The first screen 110 is structured as a transmission-type screen capable of displaying the first image P1 toward a plurality of side surfaces of the first optical member 111.

The first optical member 111 is capable of reflecting the first image P1 displayed on the first screen 110 in the practically-horizontal direction (second direction). In other words, the first optical member 111 includes at least one reflection surface that reflects and displays the first image P1 displayed on the first screen 110 in a plurality of practically-horizontal directions including a +X direction, −X direction, +Y direction, and −Y direction. The reflection surface corresponds to side surfaces S11, S12, S13, and S14 (first side surfaces) of the first optical member 111 formed in a pyramid shape in this embodiment.

The first optical member 111 has a square pyramid shape including an apex S1 (first apex portion) opposing the first screen 110 in the Z-axis direction and four side surfaces S11 to S14. The side surfaces S11 and S12 are formed at an appropriate angle to enable the first image P1 to be reflected in the +X and +Y directions, respectively. On the other hand, the side surfaces S13 and S14 are formed at an appropriate angle to enable the first image P1 to be reflected in the −X and −Y directions, respectively. It should be noted that the first apex portion does not need to be a sharp apex of a square pyramid, and the square pyramid may include a small flat portion or be formed in an R shape.

Although the side surfaces S11 to S14 are formed as flat surfaces, the shape is not limited thereto, and the side surfaces S11 to S14 may be formed as curved surfaces. The first optical member 111 in this embodiment reflects the first image P1 by the side surfaces S11 to S14 at a predetermined elevation/depression angle (upward angle (elevation angle) and downward angle (depression angle) with respect to horizontal direction).

Typically, the first optical member 111 is formed of a translucent material. As the translucent material, there are, in addition to a synthetic resin material having translucency, such as acryl, polyethylene, polystyrene, polyethylene terephthalate, and polycarbonate, inorganic materials such as glass and ceramics. Since the first optical member 111 has translucency, a virtual image of the first image P1 can be displayed on a back of the side surfaces S11 to S14 (or inside first optical member 111) as will be described later.

The first optical member 111 may either be solid or hollow. When the first optical member 111 is hollow, the hollow portion can be used as an accommodation space for a predetermined article. A type of the article is not particularly limited and is selected from a display content of the first image P1, for example. Typically, when the first image is related to an advertisement, a product related to the advertisement corresponds to the article.

(Second Display Unit)

The second display unit 12 includes a pyramid-shape second optical member 121. The second optical member 121 in this embodiment has a square pyramid shape including an apex S20 (second apex portion) and four side surfaces S21, S22, S23, and S24 (second side surfaces). The side surfaces S21 to S24 are respectively connected to the side surfaces S11 to S14 of the first optical member 111. It should be noted that the second apex portion does not need to be a sharp apex of a square pyramid, and the square pyramid may include a small flat portion or be formed in an R shape.

The second optical member 121 is formed of a translucent material, and at least one of the side surfaces S21 to S24 constitutes the second screen 120. The second screen 120 is structured as a transmission-type screen and is tilted at an appropriate tilt angle to enable the second image light L2 that has passed the inside of the second optical member 121 and been imaged on the second screen 120 to be displayed in the practically-horizontal directions.

As the translucent material forming the second optical member 121, there are, for example, in addition to a synthetic resin material having translucency, such as acryl, polyethylene, polystyrene, polyethylene terephthalate, and polycarbonate, inorganic materials such as glass and ceramics. Since the second optical member 121 has translucency, a virtual image of the second image P2 can be displayed on a back of the side surfaces S21 to S24 (or inside second optical member 121) as will be described later.

Although the side surfaces S21 to S24 are formed as flat surfaces, the shape is not limited thereto, and the side surfaces S21 to S24 may be formed as curved surfaces. The second optical member 121 in this embodiment reflects the second image P2 by the side surfaces S21 to S24 at a predetermined elevation/depression angle (upward angle (elevation angle) and downward angle (depression angle) with respect to horizontal direction).

The second optical member 121 may either be solid or hollow. When the second optical member 121 is hollow, the hollow portion can be used as an accommodation space for a predetermined article. When the first optical member 111 is hollow, the hollow portion of the second optical member 121 may be connected to the hollow portion of the first optical member 111.

The shape of the second optical member 121 in this embodiment is upside down from that of the first optical member 111 so as to integrally form a single octahedral body. It should be noted that the shape of the second optical member 121 is not limited to the shape described above, and the second optical member 121 may be asymmetric with the first optical member 111.

As described above, the second screen 120 is constituted of at least one of the side surfaces S21 to S24 of the second optical member 121. While an example where the side surfaces S21 and S23 are used as the second screen 120 will be described in this embodiment, it is also possible to cause an arbitrary surface to function as the second screen 120 based on a video source projected from the light source 13.

(Reflection Member)

The display apparatus 10 of this embodiment further includes a reflection member 14 that reflects the second image light L2 projected from the light source 13 onto the second screen 120 (side surfaces S21 to S24). The reflection member 14 may be provided at any position as long as the second image light L2 projected from the light source 13 can be reflected toward the second screen 120.

The reflection member 14 in this embodiment is constituted of a practically-rectangular ring member in which four plate-like reflection mirrors 141, 142, 143, and 144 arranged around the first screen 110 are coupled to one another. A structure of reflection surfaces of the reflection mirrors 141 to 144 is not particularly limited as long as it is a mirror surface and may be a metal surface, a white resin surface, a glass surface, or the like.

The reflection member 14 is set in a casing 15 for supporting the first screen 110, the light source 13, and a controller (not shown) that controls a drive of the light source 13. Although not shown, the casing 15 further includes a support member for supporting the first and second display units 11 and 12.

The reflection mirror 141 is capable of reflecting the second image light L2 toward the side surface S21 of the second optical member 121 via the side surface S13 of the first optical member 111, and the reflection mirror 142 is capable of reflecting the second image light L2 toward the side surface S22 of the second optical member 121 via the side surface S14 of the first optical member 111. On the other hand, the reflection mirror 143 is capable of reflecting the second image light L2 toward the side surface S23 of the second optical member 121 via the side surface S11 of the first optical member 111, and the reflection mirror 144 is capable of reflecting the second image light L2 toward the side surface S24 of the second optical member 121 via the side surface S12 of the first optical member 111. As described above, by structuring the first optical member 111 as a part of the path of the reflection light of the second image light L2, a degree of freedom in installing the second screen 120 (side surfaces S21 to S24) can be raised.

(Light Source)

The light source 13 is constituted of a projector (projection-type image display apparatus). The light source 13 is provided below the first screen 110 and projects the first and second image light L1 and L2 toward the first screen 110 and the reflection member 14.

Figure 3:
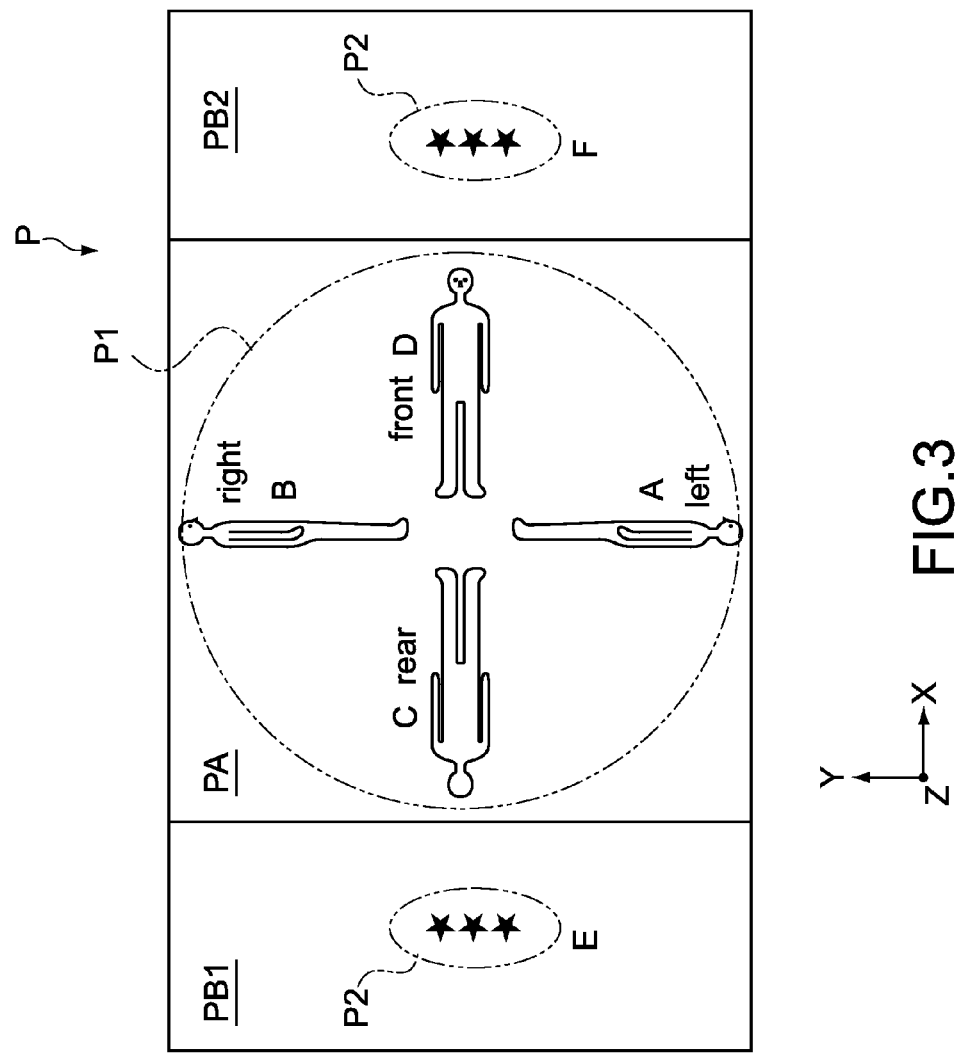
FIG. 3 is a plan view showing an example of a projection video of a light source in the display apparatus.

FIG. 3 is a plan view showing an example of a video P projected from the light source 13. The video P is divided into a square area PA and rectangular areas PB1 and PB2 positioned on both sides of the area PA. An aspect ratio of the video P is, for example, 16:9 or 4:3, and determined based on a type of a video modulation device constituting the projector.

The light source 13 projects the first and second image light L1 and L2 forming the images of the areas PA, PB1, and PB2 distributively onto the first screen 110 and the reflection member 14 and forms real images of the first and second images P1 and P2 on the first and second screens 110 and 120 (side surfaces S21 and S23).

The area PA includes the first image P1, and the areas PB1 and PB2 include the second images P2. The first image P1 is projected onto the first screen 110. The second image P2 of the area PB1 is projected onto the second screen 120 (side surface S21) via the reflection mirror 141, and the second image P2 of the area PB2 is projected onto the second screen 120 (side surface S23) via the reflection mirror 143.

The light source 13 projects a plurality of images that differ for each of the side surfaces S11 to S14 of the first optical member 111 onto the first screen 110 as the first image light L1. The first image P1 includes a plurality of image portions that differ for each of the plurality of side surfaces S11 to S14. In the example shown in the figure, the plurality of image portions include a plurality of images (front image "D", rear image "C", left-hand side image "A", and right-hand side image "B" of person) obtained when a target person is viewed from a plurality of different viewpoints, and those images are arranged at a 90° interval around the feet of the person rotating 90° at a time. By projecting the first image light L1 forming the first image P1 onto the back surface of the first screen 110, the light source 13 images the first image P1 on the first screen 110.

The second images P2 in the areas PB1 and PB2 are structured by images constituted of characters, figures, a combination of those, and the like. The second images P2 may be the same image or may be different images.

By projecting the second image light L2 forming the second images P2 onto the back surface of the second screen 120 (side surfaces S21 and S23), the light source 13 images the second images P2 on the second screen 120 (side surfaces S21 and S23). In the example shown in the figure, an image "E" included in the area PB1 is projected onto the side surface S21, and an image "F" included in the area PB2 is projected onto the side surface S23.

It should be noted that since the second image light L2 forming the images "E" and "F" has a linear property and the images are imaged on the side surfaces S21 and S23, the images are not displayed on the surfaces other than the side surfaces S21 and S23. Moreover, by arranging the side surfaces S11 and S13 of the first optical member 111 to be practically vertical to the reflection light, the second image light L2 reflected by the reflection member 14 can efficiently reach the second screen 120 (side surfaces S21 and S23).

The first optical member 111 is set above the first screen 110 such that the apex S10 thereof is positioned at a center of the first image P1 and the side surfaces S11 to S14 oppose the images constituting the first image P1 in the longitudinal direction. In this embodiment, the left-hand side image "A" opposes the side surface S14, the right-hand side image "B" opposes the side surface S12, the rear image "C" opposes the side surface S13, and the front image "D" opposes the side surface S11. The images may either be still images or moving images.

Figure 4:
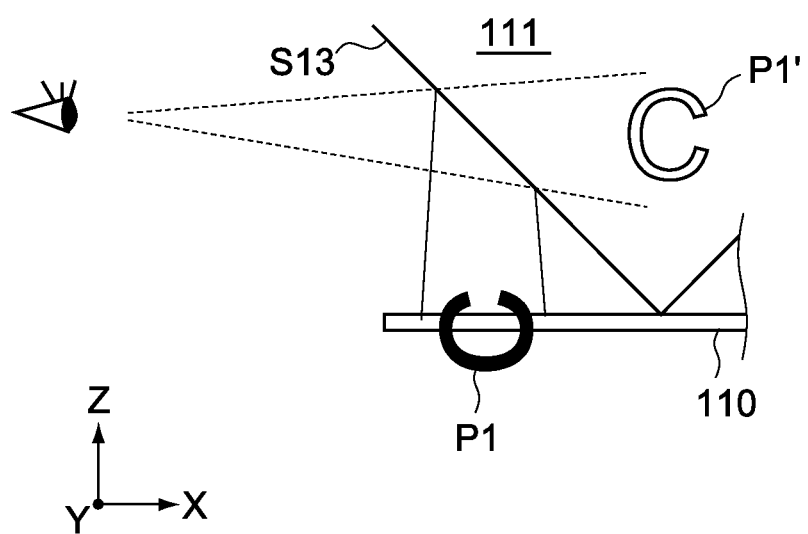
FIG. 4 is a schematic side view of a main portion for explaining an operation of the display apparatus.

As shown in FIG. 4, the real image of the first image P1 projected onto the first screen 110 (rear image "C") is reflected by the side surface S13 of the first optical member 111 in the horizontal direction (−X direction). At this time, since the side surface S13 is formed of a translucent material, a user opposing the side surface S13 visually recognizes a virtual image P1' of the rear image "C" on a back side of the side surface S13, that is, inside the first optical member 111.

As described above, in this embodiment, it is possible to cause the user feel as if a person is standing upright inside the first optical member 111. Since virtual images of the front image "D", the right-hand side image "B", and the left-hand side image "A" are similarly displayed on the other side surfaces S11, S12, and S14, 3D virtual images that differ depending on the viewing direction can be provided to the user.

It should be noted that the virtual image P1' is formed at a position equidistance from the first screen 110 and the side surface S13. Therefore, by setting a tilt angle of the side surfaces S11 to S14 such that the distance from the first screen 110 and the distance from the center of the first optical member 111 become the same, the virtual image P1' can be displayed at substantially the center of the first optical member 111 even when viewed from any direction.

Further, in this embodiment, since the second images P2 are displayed to the user in addition to the virtual image P1', display of more complex or expansive information becomes possible. Such a display form can be widely used in a field of, for example, digital signage and can be structured as a product exhibition display that uses a virtual image.

(High-Luminance Display of Virtual Image)

As the light source 13 that forms the virtual image P1', a liquid crystal monitor can be adopted in addition to the projector. However, a luminance of a general liquid crystal monitor is as low as about 300 cd/m2. Moreover, in a case of a recent liquid crystal monitor having a wide view angle, light is irradiated in all directions, and thus a phenomenon in which only a portion on an axis is bright does not occur. Therefore, when a real image with a luminance of about 300 (cd/m2) is reflected by a transparent material such as acryl, polystyrene, and optical glass, a reflectance becomes about 12%, thus satisfying the following expression which is insufficient as brightness.

$$300 \text{ (cd/m2)} * 0.12 = 36 \text{ (cd/m2)} \quad (1)$$

Therefore, a virtual image to be obtained is difficult to be viewed, thus lacking a messaging property of signage. Moreover, since light is irradiated in all directions in the case of a recent liquid crystal monitor having a wide view angle, there is a defect that an image (real image) displayed on a display surface of the liquid crystal monitor is apt to stick out more than the virtual image to be originally viewed.

In general, about 100 (cd/m2) is required as brightness enough to endure visibility under a fluorescent lamp in a room, which corresponds to brightness when a 50 lm (lumen)-class pico projector is projected in a 25-inch size. Therefore, when a liquid crystal monitor is used as the light source 13, a virtual image becomes dark. Even with anomalous luminescence of the liquid crystal monitor, it is difficult to obtain a bright image since brightness of a backlight is limited.

Furthermore, although the reflectance of the transparent member (corresponds to first optical member 111) that reflects an actual image can be raised by using a half mirror or the like, a certain level of transmittance is required for causing a virtual image to be seen as if floating in the transparent member.

On the other hand, when the projector is used as the light source 13, the projection luminance rises even with the same lumens when projected onto a small area. As a result, a bright real image can be obtained. Moreover, with an increase of an output of a light-emitting device such as a laser and a light-emitting diode (LED: Light Emitting Diode), high luminance can be obtained even with the same projection size.

As the first screen 110 on which the first image P1 (real image) is displayed, a back-surface-transmission-type screen (rear screen) having a high screen gain (e.g., 5.5 or more) may be adopted. As the screen gain increases, a real image to be displayed becomes brighter.

In general, the screen gain indicates a ratio of a luminance value obtained by measuring reflection light irradiated onto a perfect diffusion plate from a certain light source using a luminance meter and irradiating the light onto a screen material from different angles under the same condition with the luminance value being 1. The perfect diffusion plate refers to a diffusion plate that indicates an almost-constant reflectance across 180° back and forth and around (or longitudinal and lateral directions). It should be noted that in descriptions below, the screen gain will also be simply referred to as "gain".

Figure 5:
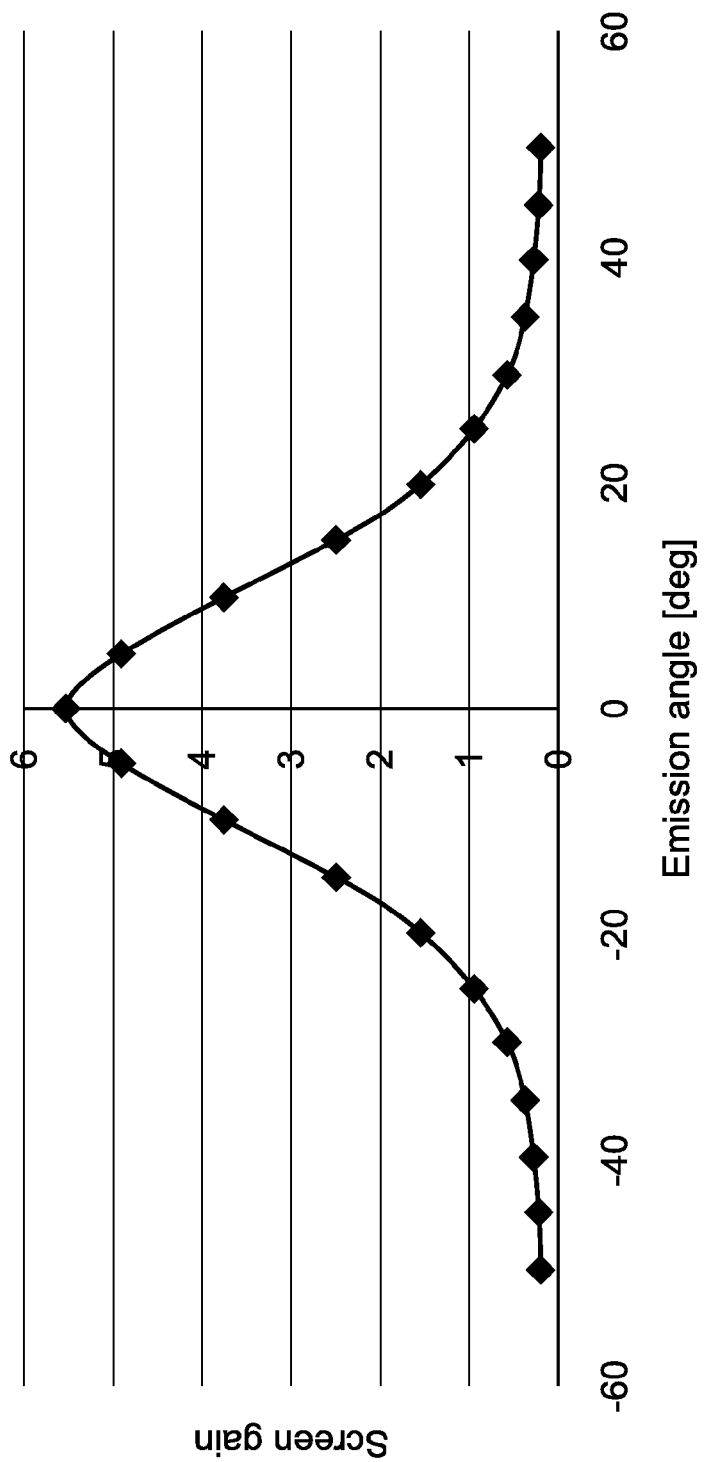
FIG. 5 is a diagram showing a characteristic example of a first screen in the display apparatus.

FIG. 5 is a diagram showing a characteristic example of a rear screen having a screen gain of 5.5. The gain is high in an area with a small emission angle, a luminance of a projection image of about 5.5 times can be obtained in a direction vertical to the screen, and a gain of 1 or more can be obtained within a range of ±20°. In the structural example where a real image is projected onto the first screen 110 and the first optical member 111 is provided right above it as in this embodiment, the screen having a high gain is extremely efficient with respect to an increase in the luminance.

Here, a case where a virtual image is formed by a projection image of 19 inches using a 50-lm pico projector as the light source 13 and a rear screen having a screen gain of 5.5 will be discussed.

A light flux of 50 lm in a front projection becomes about 100 (cd/m2) in a 25-inch projection. Therefore, in the 19-inch projection, a bright real image can be obtained as follows.

$$100 \text{ (cd/m2)} * (25/19)^2 * 5.5 = 952 \text{ (cd/m2)} \quad (2)$$

When the actual image is reflected by a transparent member formed of polystyrene or the like having a reflectance of about 12%, the brightness of the reflection light is as follows.

$$952 \text{ (cd/m2)} * 0.12 = 114 \text{ (cd/m2)} \quad (3)$$

This is equal to or larger than the brightness when 50 lm is front-projected to 25 inches and is sufficient brightness. The result of (3) indicates that a virtual image brighter than 36 (cd/m2) derived from (1) can be obtained, which is sufficient as a presence of a virtual image floating in space and appealing as signage under a ceiling lamp.

Further, since the first optical member 111 is hollow in this embodiment, the first image P1 is reflected by front and back surfaces of the side surfaces S11 to S14. As a result, a light intensity increases as compared to a case of reflecting only by the front surfaces of the side surfaces S11 to S14, and thus the luminance of a virtual image can be raised.

Here, in the case where the first optical member 111 is hollow, there is a fear that the visibility of the first image is impaired due to light reflected by inner surfaces of plate members constituting the side surfaces S11 to S14. For solving such a problem, the thickness of the side surfaces S11 to S14 is smaller the better. The thickness of the side surfaces S11 to S14 is determined by a pixel pitch of a real image or the like and is set to be, for example, 0.5 mm or less.

Furthermore, by adopting a high-gain rear screen as the first screen 110, a real image displayed on the first screen 110 can be made difficult to be seen by the user.

Figure 6:
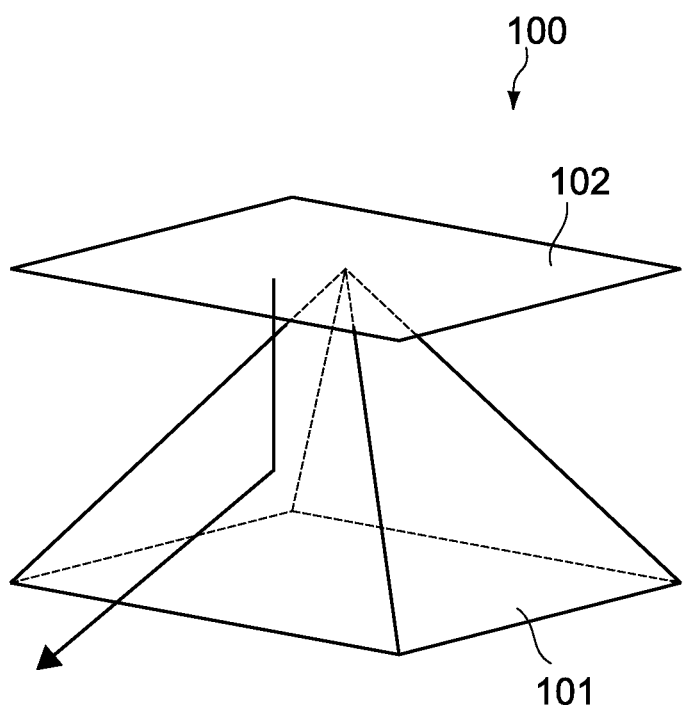
FIG. 6 is a schematic structural diagram of a display apparatus according to a modified example.

For example, FIG. 6 shows a display apparatus in which a liquid crystal monitor 102 is provided above a square-pyramid-shape transparent member 101 with its display surface facing downward. The display apparatus 100 is structured to be capable of reflecting an image displayed on the display surface of the liquid crystal monitor 102 by a side surface of the transparent member 101 and displaying a virtual image of the image inside the transparent member 101. With this structure, the image (real image) displayed on the display surface of the liquid crystal monitor 102 can be made difficult to be seen by the user, but since the liquid crystal monitor 102 having a presence is lying above the transparent member 101, it lacks a sense of openness as a display.

On the other hand, according to the display apparatus 10 of this embodiment, by adopting a high-gain rear screen for the first screen 110 that displays a real image of the first image P1, most of the light of a real image travels toward the side surfaces S11 to S14 of the first optical member 111, with the result that the real image can be hardly seen from an oblique viewpoint with respect to the display apparatus 10. Therefore, since only the virtual image P1' can be presented to the user, it is possible to stimulate the user's curiosity and enhance a signage property. Moreover, since there is no need to arrange a display device for an actual image on the first display unit 11, another transparent member such as the second screen 120 can be provided, and thus a degree of freedom in staging is enhanced. The advantages as described above can be obtained by the light source 13 constituted of the projector and the first screen 110 having a high gain.

(Performance of Projector)

The display apparatus 10 of this embodiment is capable of displaying, using a linear property of light, the second image light L2 in the areas PB1 and PB2 (FIG. 3) on the second screen 120 (side surfaces S21 and S23) different from the first screen 110. At this time, the images P1 and P2 displayed on the first screen 110 and the second screen 120 (side surfaces S21 and S23) need to be brought into focus. In this regard, the projector used as the light source 13 is structured as follows.

As described above, the light fluxes of the areas PA, PB1, and PB2 of the video P (first and second image light L1 and L2) projected from the light source 13 are projected onto different screens (first and second screens 110 and 120). Here, a case of a 19-inch projection will be discussed as in the descriptions above.

In a case where an aspect ratio is, for example, 16:9 in a projector with a throw ratio (projection distance/horizontal projection size) of 1.07 (=horizontal field angle of 50 degrees), a projection distance required for the 19-inch projection is 450 mm. A total height of the rear screen (first optical member 111 and second optical member 121 provided above first screen 110) is set to 300 mm. Assuming that partial light fluxes of the areas PB1 and PB2 (second image light L2) are bent by the reflection member 14 (reflection mirrors 141 and 143) to be projected onto the side surfaces S21 and S23 of the second optical member 121 from the back surface side, the projection distance becomes $$450 \text{ (mm)} + 300*(3/4) = 675 \text{ (mm)} \quad (4)$$

in average. Therefore, the projection distance of 450 mm in the area PA differs from the projection distance of 675 mm in the areas PB1 and PB2 (difference Δ is 225 mm), and thus there is a need to bring both of the images into focus. In other words, unless a depth of field is large as the projector, one of the images is blurred when the other image is brought into focus, which is unfavorable.

Here, for the projector, according to the types of the light-emitting device (light source) and display device (modulation device), systems of (1) DLP (registered trademark) (light-emitting device: LED), (2) LCOS (Liquid Crystal On Silicon) (light-emitting device: LED), (3) LCOS (light-emitting device: LD (Laser Diode)), and (4) MEMS (Micro Electrical Mechanical System) are known.

The projector of the type (4) above uses a parallel beam scanning system, and the brightness is about 30 lm, which is insufficient.

Figure 7:
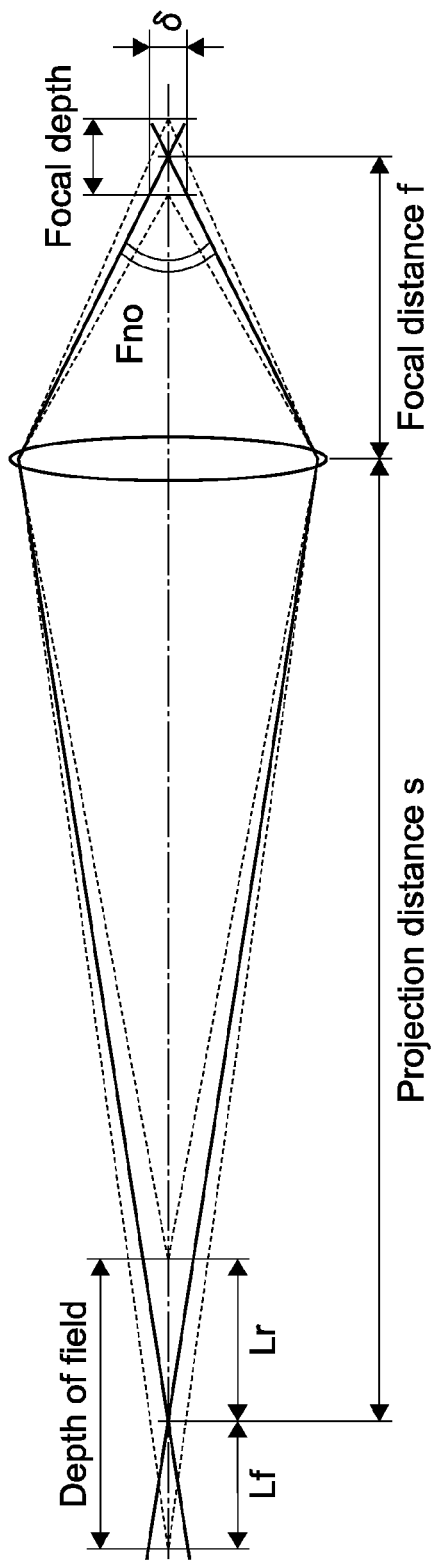
FIG. 7 is a diagram for explaining characteristics of a projector constituting the light source.

On the other hand, in a projector that uses an LED as the light-emitting device as in (1) and (2) above, a width for a focus is small, and the screens cannot be arranged expectedly. Since the projector that uses an LED as the light-emitting device efficiently takes in light emitted from the light-emitting device, Fno (F number) of an illumination optical system is set to be small (e.g., Fno=2). When a focal distance of a lens is represented by f (mm), an aperture (F number) is represented by Fno, a diameter of a permissible circle of confusion is represented by δ (mm), and a subject distance is represented by s (mm) as shown in FIG. 7, a relationship between the Fno of the illumination optical system and the depth of field becomes Fno 8 depth of field as follows.

$$\text{Rear depth of field } Lr = (\delta * Fno * L2)/(f2 - \delta * Fno * s) \quad (5)$$

$$\text{Front depth of field } Lf = (\delta * Fno * L2)/(f2 + \delta * Fno * s) \quad (6)$$

$$\text{Depth of field } L = Lr + Lf \quad (7)$$

As described above, with a small Fno, a required depth of field cannot be obtained. The diameter δ of a permissible circle of confusion in the case of a projector corresponds to a pixel size of LCOS or DLP (registered trademark) as a modulation device. Therefore, although affected by the pixel (resolution) or the focal distance of a lens, calculations under the same condition as the LCOS of (3) above that uses an LD as the light-emitting device show the results as shown in Table 1.

TABLE 1

| Light source<br>Display device | | (1) LED<br>DLP (registered<br>trademark) | (3) LD<br>LCOS | |
|---|---|---|---|---|
| Aperture | Fno | 2 | 6 | |
| Focal distance | f | 10 | 10 | mm |
| Pixel size | δ | 6.00 | 6.00 | μm |
| Resolution | | 1366*768 | 1366*768 | |
| Panel size | WXGA | 0.37 | 0.37 | inch |
| Aspect ratio | | 16:9 | 16:9 | |
| Projection distance | s | 560 | 560 | mm |

TABLE 1-continued

| Light source<br>Display device | | (1) LED<br>DLP (registered<br>trademark) | (3) LD<br>LCOS | |
|---|---|---|---|---|
| Front depth of field | Lr | 40.3 | 141.3 | mm |
| Rear depth of field | Lf | 35.2 | 93.9 | mm |
| Depth of field | L | 75.6 | 235.2 | mm |

A case where the first and second images P1 and P2 are focused at an intermediate position (560 mm) between a distance 450 mm between the light source 13 and the first screen 110 and a distance 675 mm between the light source 13 and the second screen 120 will be discussed. As shown in Table 1, in the LCOS system using an LED having an Fno of about 2, that places an importance on a light capture efficiency, the depth of field is only 75.6 mm, which is far from a difference of the design example (Δ=225 mm), and thus both images cannot be brought into focus.

On the other hand, in the LCOS system that uses a laser, the Fno of the illumination optical system required for efficiently taking in collimation light from the laser is about 6, which is sufficient and is within a range in which the images are brought into focus at the depth of field of 235.2 mm as shown in Table 1. Since this is within the range of the difference of the design example (Δ=225 mm), the first screen 110 and the second screen 120 can both be brought into focus.

As described above, the projector constituting the light source 13 only needs to have a brightness of 50 lm or more, and the depth of field equal to or larger than the difference between the projection distances only needs to be secured with respect to the first screen 110 and the second screen 120.

It should be noted that the type of projector may be determined based on the brightness of a virtual image to be displayed or the distances of the first screen 110 and the second screen 120 from the light source 13, and a projector adopting the LCOS system of (2) above that uses an LED, the DLP (registered trademark) system of (1) above, or the MEMS system of (4) above may be adopted according to the specification.

(Countermeasure for Undesired Reflection Image)

Next, a countermeasure for an undesired reflection image from the second optical member 121 will be described.

Figure 8:
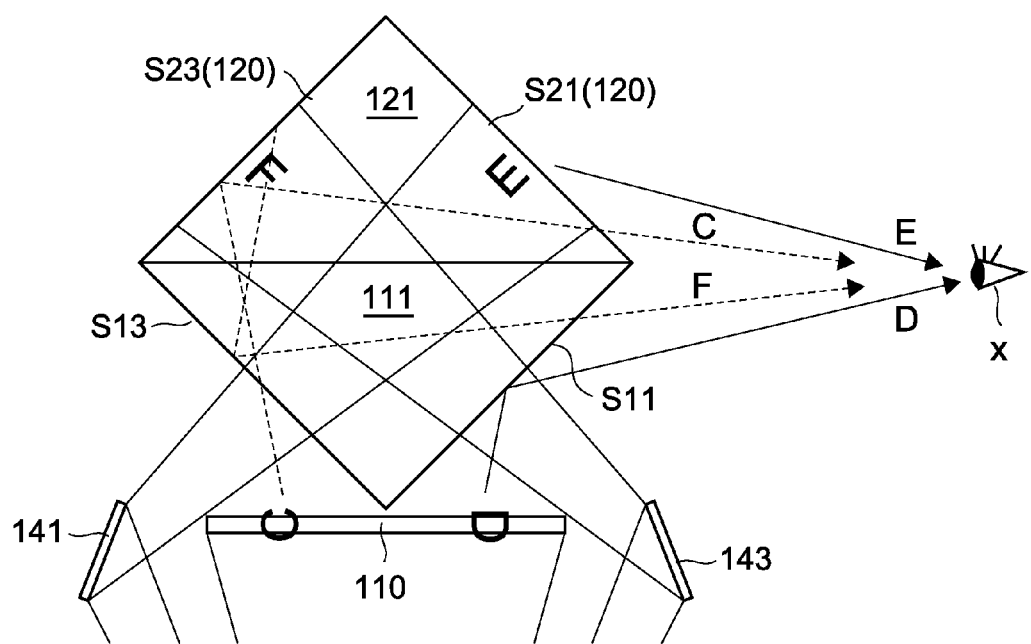
FIG. 8 is a schematic side view for explaining a generation mechanism of an undesired reflection image in the display apparatus.

When an image is viewed from a viewpoint x as shown in FIG. 8, only a virtual image "D" seen via the side surface S11 and a real image "E" displayed on the side surface S21 become the images to be originally viewed. However, there are cases where undesired reflection images such as the reflection image of the image "F" projected on the side surface S23 and the reflection image obtained as the image "C" is reflected by the side surface S23 on the first screen 110 are seen from the viewpoint x at the same time. Since the undesired reflection images as described above become ghosts, generation of such images needs to be suppressed.

As the countermeasure for suppressing an undesired reflection image, the second screen 120 (side surfaces S21 to S24) can be constituted of a transparent screen having a high gain (narrow view angle). Specifically, most of the second image light L2 reflected by the reflection member 14 vertically enters the side surfaces S21 to S24. Therefore, by structuring the side surfaces S21 to S24 by a screen with a limited view angle with which the second image P2 disappears when the screen tilts several-ten degrees from the horizontal direction, it is possible to eliminate the path of the reflection light "F". As the transparent screen with such an optical gain, a screen having a high transparency, in which a minute amount of diffusion beads are impregnated into a transparent member formed of acryl or the like can be adopted.

As another structural example that can suppress an undesired reflection image, there is a method of forming an antireflection film (AR (Anti-reflect) coat) on front and back surfaces (light-incident surface and light-emitting surface) of each of the side surfaces S21 to S24. As shown in FIG. 8, the reflection image of the real image "C" enters the side surface S23 at an incident angle of about 45 degrees. In this regard, AR coating with which a reflection of incident light, that enters at an incident angle of, for example, 45±15 degrees, can be suppressed is performed on the back surface of the side surface S23. In a case where a laser light source having a small RGB spectrum width is used as the light source 13, the AR coating does not need to be performed in a wide spectrum, and an AR film specialized only in RGB wavelengths may be formed. As a result, an undesired reflection image of the real image "C" can be removed.

Next, the shape of the second optical member 121 effective as the countermeasure for an undesired reflection image will be described.

Figure 9:
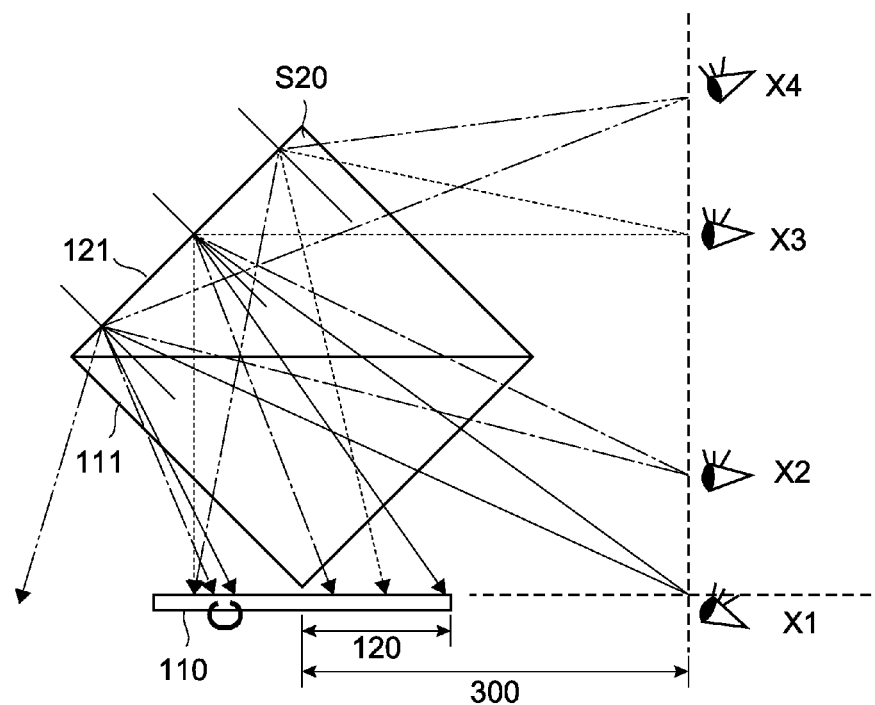
FIG. 9 is an explanatory diagram of a position at which the undesired reflection image can be observed.

FIG. 9 is a schematic diagram showing optical paths of an undesired reflection image "C" at a time the first optical member 111 and the second optical member 121 are observed from a plurality of observation points X1, X2, X3, and X4 at different heights in the display apparatus 10 of this embodiment.

The observation points X1 to X4 are set at positions 300 mm from the center of the first screen 110 (centers of first and second optical members 111 and 121) in the horizontal direction. A total width of the first screen 110 is 240 mm, and an angle of the apex S20 of the second optical member 121 is a right angle.

X1 is an observation point that sees the first optical member 111 from below, X2 is an observation point that sees a virtual image displayed on the first optical member 111 from the front, X3 is an observation point that sees a real image displayed on the second optical member 121 from the front, and X4 is an observation point that sees the second optical member 121 from above. In this example, although there are differences in the amounts of the undesired reflection image "C" that can be seen, the undesired reflection image "C" can be observed from any of the observation points X1 to X4.

Figure 10:
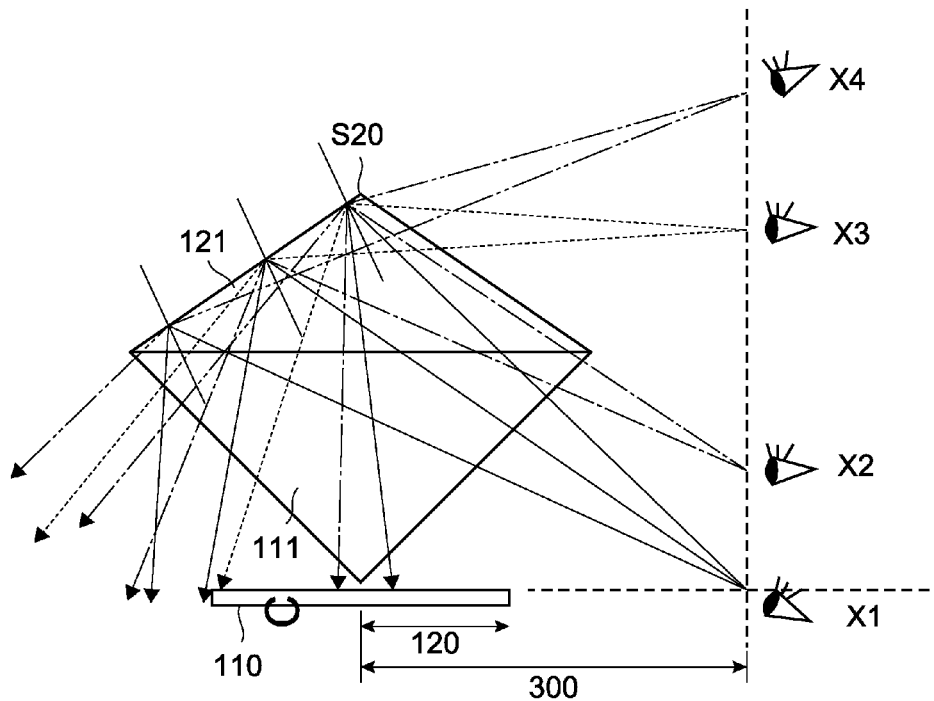
FIG. 10 is a diagram showing a structural example of the display apparatus in which a measure to prevent the undesired reflection image from being generated is taken.

Here, when the apex S20 of the second optical member 121 is set at a shallow point (with large apex angle), the undesired reflection image "C" cannot be seen from the observation points X3 and X4 as shown in FIG. 10. By forming the antireflection film (AR coat) on each of the side surfaces of the second optical member 121, the brightness of the reflection image seen from the observation points X1 and X2 becomes low. The size of the apex angle can be set as appropriate based on the distance from the observation point, the size of the first screen 110, and the like.

Figure 11:
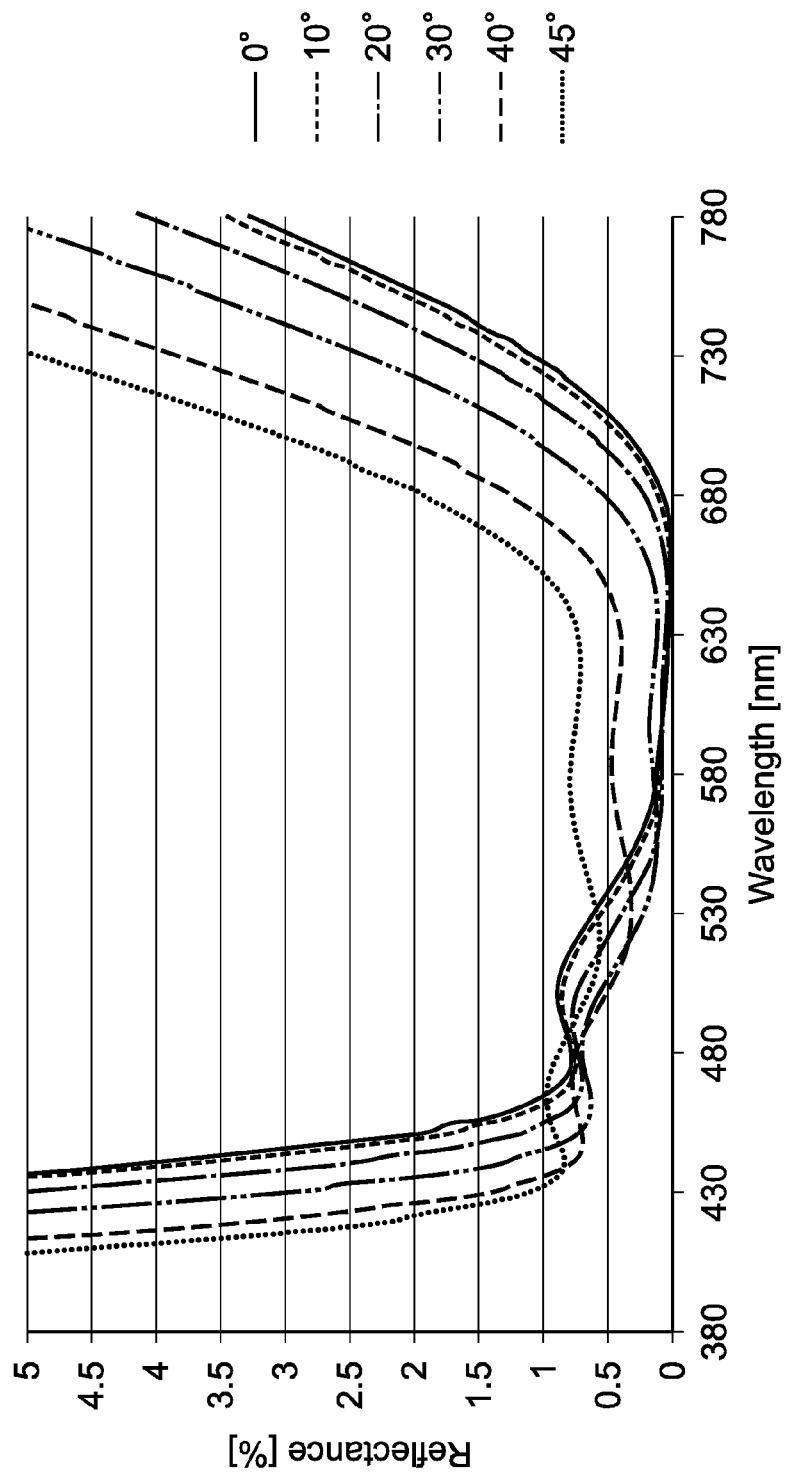
FIG. 11 is a diagram showing an example of film characteristics of a general antireflection film.

FIG. 11 shows an example of film characteristics of a general AR coat. The reflectance decreases as an angle formed with respect to the reflection surface becomes sharper (larger reflection angle). In other words, the undesired reflection image "C" that can be seen with a large reflection angle like the observation points X3 and X4 is difficult to be prevented from occurring with the AR coat described above, but the undesired reflection image "C" that can be seen at a reflection angle as small as near 0° like the observation points X1 and X2 is apt to be prevented from occurring with the AR coat.

Figure 12:
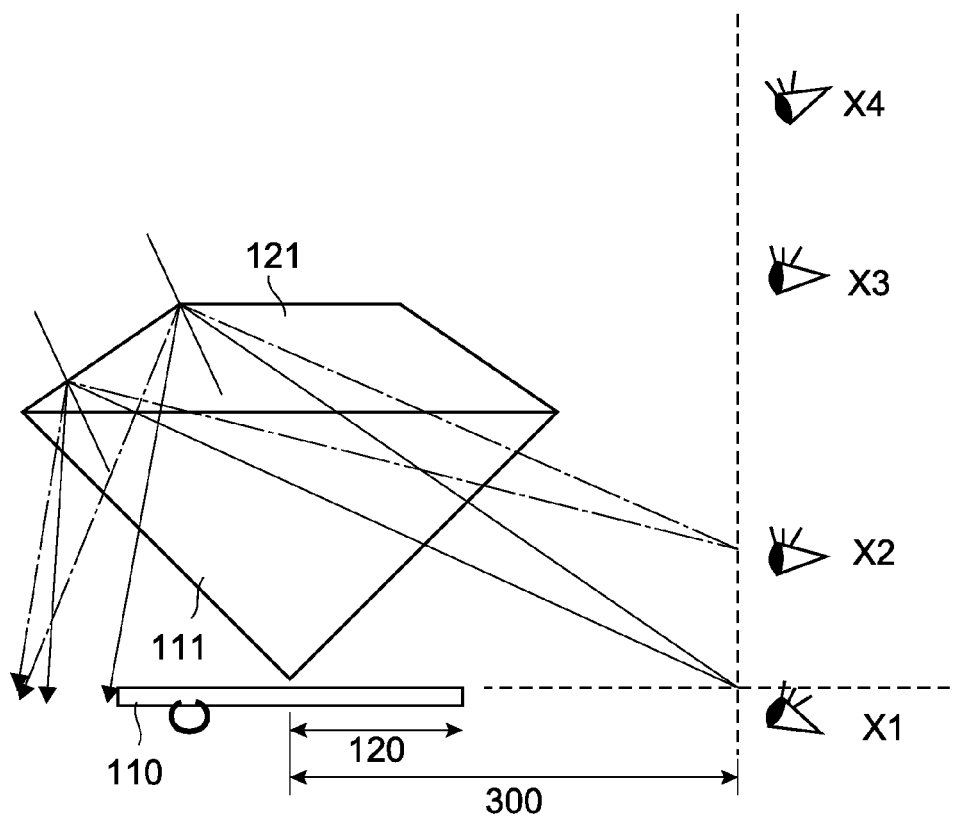
FIG. 12 is a diagram showing another structural example of the display apparatus in which the measure to prevent the undesired reflection image from being generated is taken.

Moreover, as shown in FIG. 12, by forming the apex of the second optical member 121 to be horizontal in addition to forming the apex at a shallow point, the area of the reflection surface can be reduced, with the result that the undesired reflection image "C" can be completely prevented from occurring also at the observation points X3 and X4. The area of the apex horizontal surface can be set as appropriate based on the distance to the observation point, the size of the first screen 110, and the like.

Figure 13:
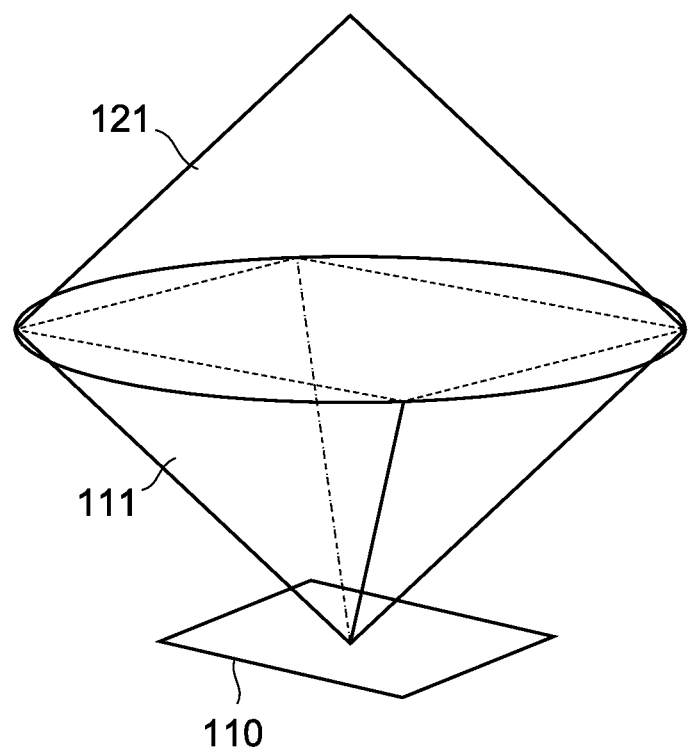
FIG. 13 is a diagram showing still another structural example of the display apparatus in which the measure to prevent the undesired reflection image from being generated is taken.

Further, an undesired reflection can also be prevented by forming the second optical member 121 in a cone shape as shown in FIG. 13. By forming the second optical member 121 in a cone shape, the undesired reflection image "C" of the first screen 110 becomes a reflection image on a cone surface, with the result that the reflection image is distorted in an arc direction. As an impression when seen by a person, an undesired image obtained as the actual image of the first screen 110 is reflected as it is may be recognized as an undesired image, but when seeing a distorted reflection image, the impression is difficult to be recognized as an undesired reflection image, and thus there is a small influence. Furthermore, since the image projected onto the second optical member 121 becomes a projection image with respect to a curved surface in this example, display with a message property in a signage area becomes possible.

Second Embodiment

Figure 14:
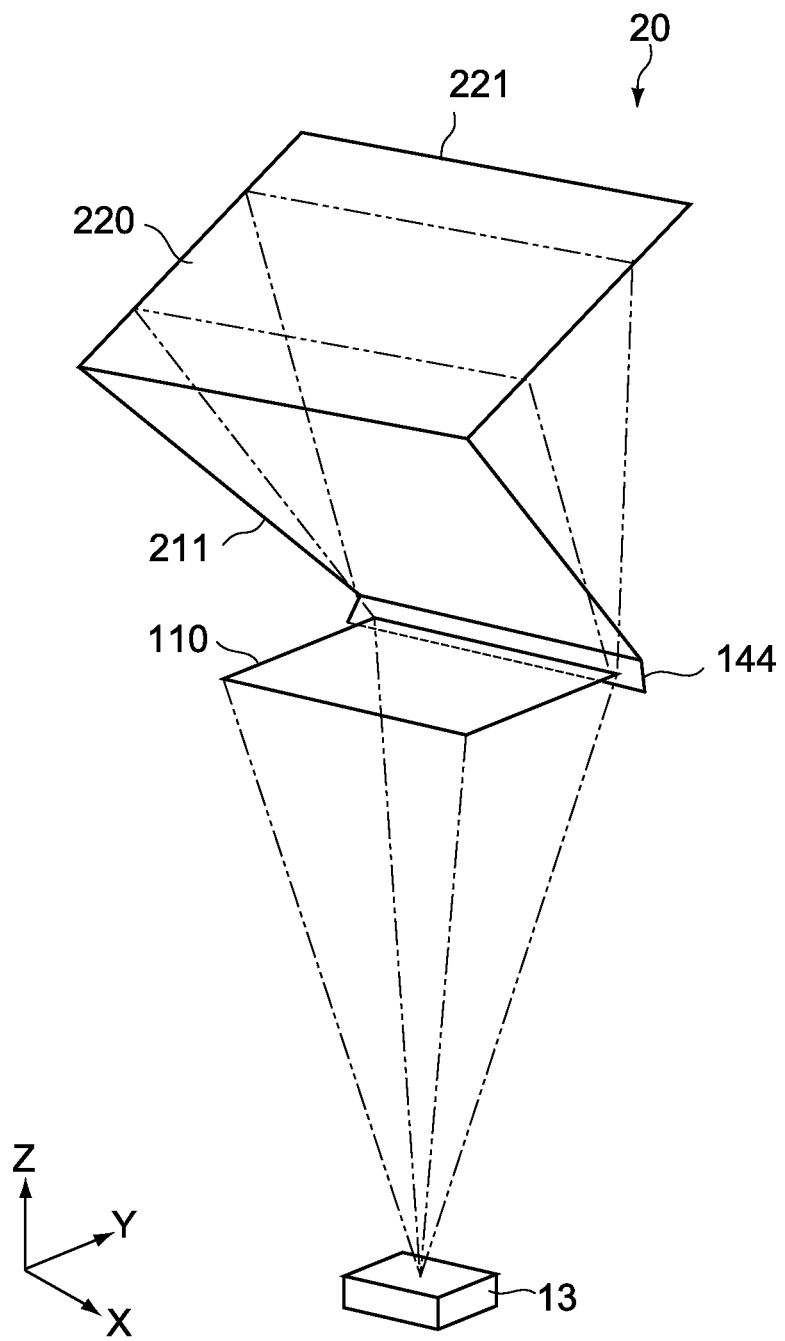
FIG. 14 is a schematic perspective view showing a structure of a display apparatus according to a second embodiment of the present disclosure.

FIG. 14 is a schematic perspective view showing a structure of a display apparatus according to a second embodiment of the present disclosure. Hereinafter, structures different from those of the first embodiment will mainly be described. In addition, structures that are the same as those of the first embodiment will be denoted by the same symbols, and descriptions thereof will be omitted or simplified.

A display apparatus 20 of this embodiment includes a first display unit including the first screen 110 and a first optical member 211, a second optical member 221 (second display unit) including a second screen 220, and the light source 13.

The first optical member 211 is formed of a translucent material and reflects and displays a first image projected onto the first screen 110 from the light source 13 in the horizontal direction (−Y direction). The second screen 220 is constituted of a transmission-type screen provided right above the first optical member 211 and displays a second image projected from the light source 13 in the horizontal direction (−Y direction).

Since the second image displayed on the second screen 220 can be provided to the user in addition to the first image displayed on the first screen 110 also in the display apparatus 20 of this embodiment, display of more complex or expansive information becomes possible. Further, although a 3-dimensional image cannot be displayed since information can be presented in only one direction in this embodiment, a sense of depth can be expressed since a virtual image of the first image can be provided. Furthermore, by similarly structuring the light source 13 and the first screen 110 as in the first embodiment above, a bright image (virtual image and real image) can be displayed as compared to the case of using a liquid crystal panel as the light source 13.

Third Embodiment

Figure 15:
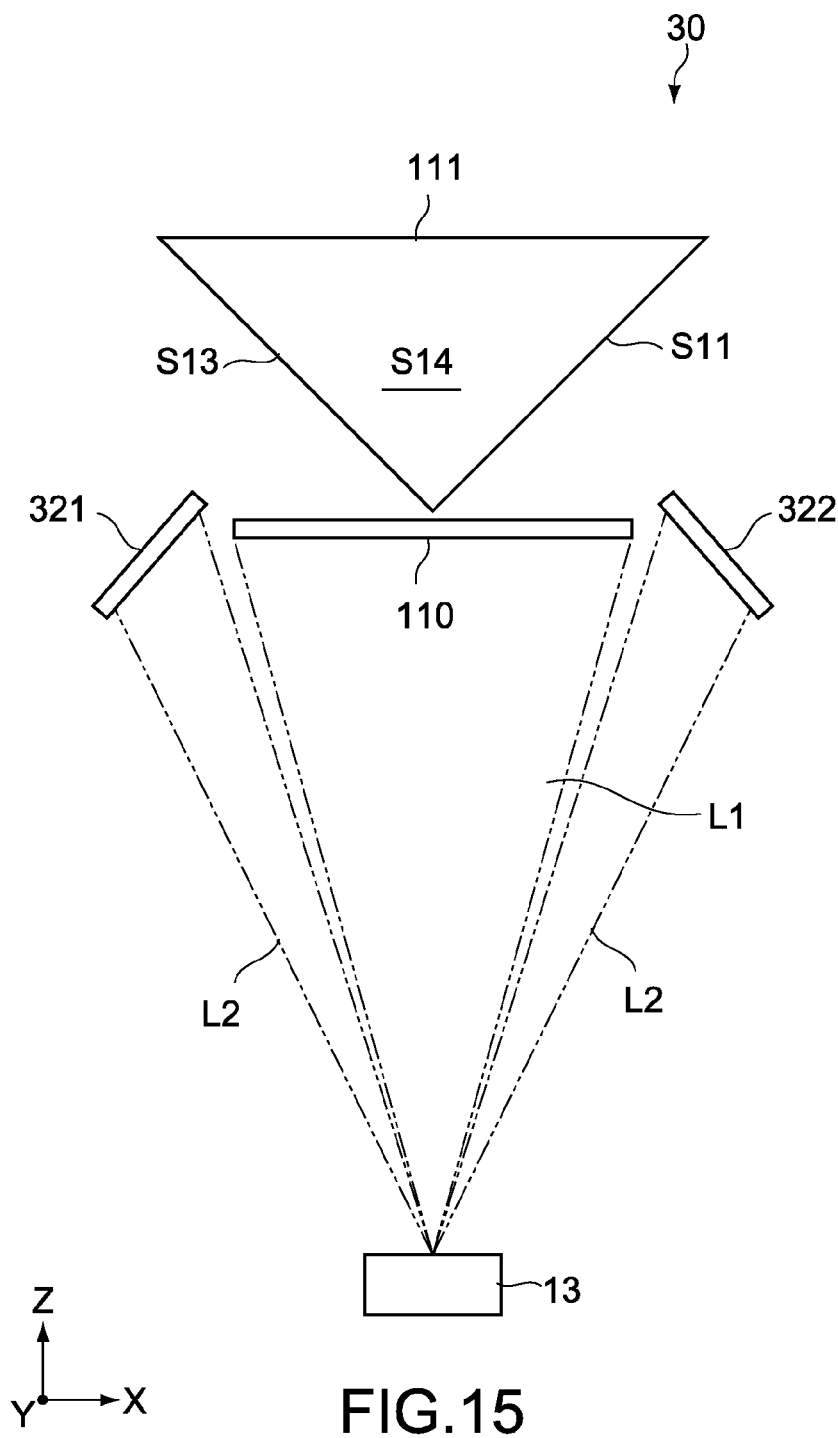
FIG. 15 is a schematic side view showing a structure of a display apparatus according to a third embodiment of the present disclosure.

FIG. 15 is a schematic side view showing a structure of a display apparatus according to a third embodiment of the present disclosure. Hereinafter, structures different from those of the first embodiment will mainly be described. In addition, structures that are the same as those of the first embodiment will be denoted by the same symbols, and descriptions thereof will be omitted or simplified.

A display apparatus 30 of this embodiment includes a first display unit including the first screen 110 and the first optical member 111, a second display unit including two second screens 321 and 322, and the light source 13.

The first optical member 111 is formed in a transparent square pyramid shape as in the first embodiment and includes the four side surfaces S11 to S14 for reflecting and displaying the first image projected onto the first screen 110 from the light source 13 in practically the horizontal direction.

The second screens 321 and 322 are each constituted of a transmission-type screen. The second screens 321 and 322 are provided around the first screen 110 and display the second image projected from the light source 13 in practically the horizontal direction. The number of second screens is not limited to two as shown in the figure, and one screen or three or more screens may be provided.

This embodiment also bears the same operational effect as the first embodiment above. According to this embodiment, since the positions of the second screens 321 and 322, the distribution position of the second image light L2, and the like can be set at arbitrary positions, a degree of freedom in signage can be imparted.

Fourth Embodiment

Figure 16:
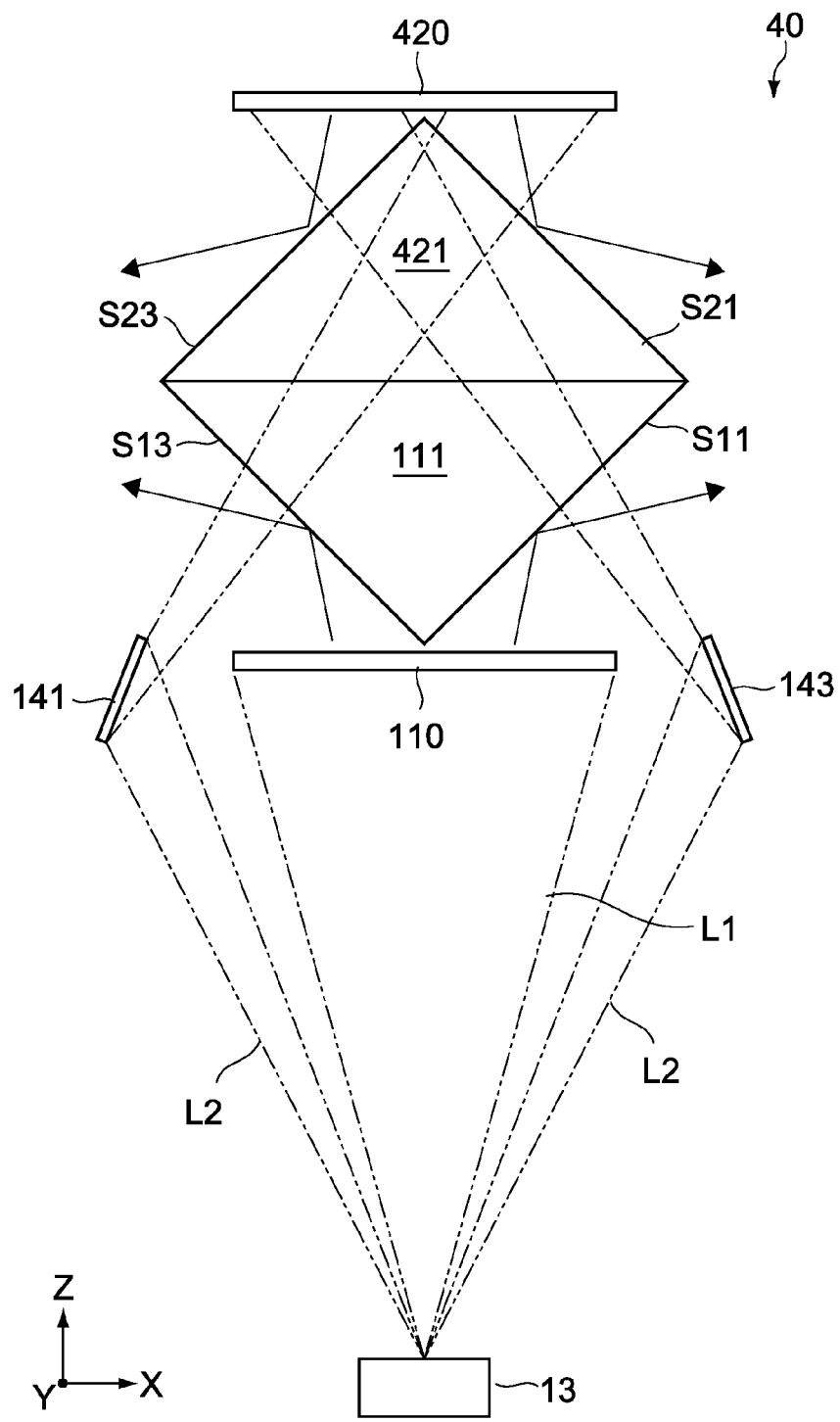
FIG. 16 is a schematic side view showing a structure of a display apparatus according to a fourth embodiment of the present disclosure.

FIG. 16 is a schematic side view showing a structure of a display apparatus according to a fourth embodiment of the present disclosure. Hereinafter, structures different from those of the first embodiment will mainly be described. In addition, structures that are the same as those of the first embodiment will be denoted by the same symbols, and descriptions thereof will be omitted or simplified.

A display apparatus 40 of this embodiment includes a first display unit including the first screen 110 and the first optical member 111, a second display unit including a second screen 420 and a second optical member 421, and the light source 13.

The first optical member 111 is formed in a transparent square pyramid shape as in the first embodiment and includes the four side surfaces S11 to S14 for reflecting and displaying the first image projected onto the first screen 110 from the light source 13 in practically the horizontal direction.

The second screen 420 is constituted of a reflection-type screen (front screen) onto which light is projected from the light source 13 via the reflection mirrors 141 and 143, the first optical member 111, and the second optical member 421 and is provided right above the second optical member 421. The second optical member 421 is formed in a transparent square pyramid shape as in the first embodiment and includes the four side surfaces S21 to S24 for reflecting the second image displayed on the second screen 420 in practically the horizontal direction.

The side surfaces S21 to S24 of the second optical member 421 may be constituted of, for example, a front screen called pearl screen in general, with which a bright image can be seen in a direction opposite from the incident direction. With this structure, brightness can be easily secured in a case where a viewpoint is fixed. Moreover, since there is a bright distribution in a reflection direction, a virtual image displayed on the first optical member 111 and a real image displayed on the second optical member 421 can be seen brightly at the same time.

Fifth Embodiment

Figure 17:
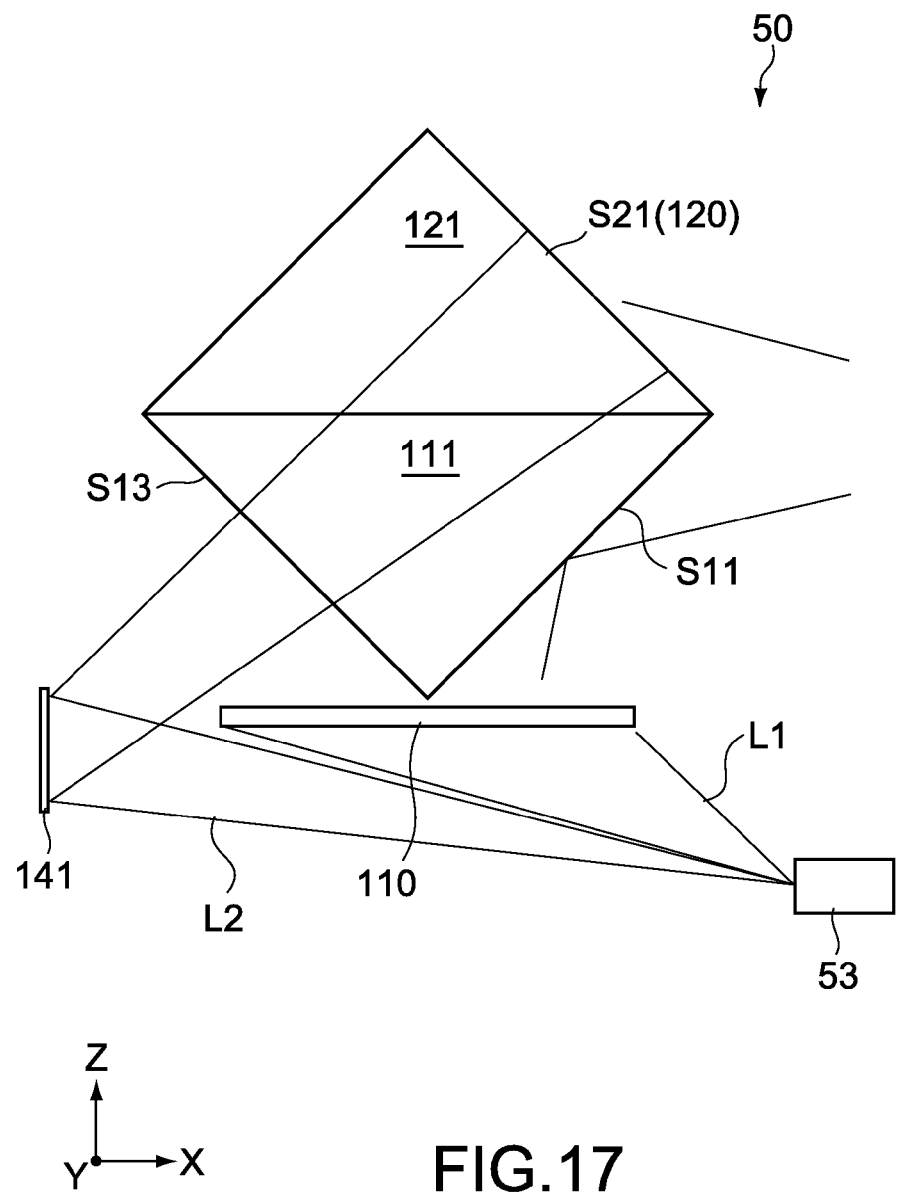
FIG. 17 is a schematic side view showing a structure of a display apparatus according to a fifth embodiment of the present disclosure.

FIG. 17 is a schematic side view showing a structure of a display apparatus according to a fifth embodiment of the present disclosure. Hereinafter, structures different from those of the first embodiment will mainly be described. In addition, structures that are the same as those of the first embodiment will be denoted by the same symbols, and descriptions thereof will be omitted or simplified.

A display apparatus 50 of this embodiment includes a first display unit including the first screen 110 and the first optical member 111, a second display unit including the second screen 120 and the second optical member 121, and a light source 53.

The first optical member 111 is formed in a transparent square pyramid shape as in the first embodiment and includes the four side surfaces S11 to S14 for reflecting and displaying the first image projected onto the first screen 110 from the light source 53 in practically the horizontal direction.

The second screen 120 is constituted of a transmission-type screen (rear screen) onto which light is projected from the light source 53 via the reflection mirror 141, the first optical member 111, and the second optical member 121 and is provided on the side surface S21 of the second optical member 121. The second screen 120 displays the second image projected from the light source 53 in practically the horizontal direction (+X direction).

The light source 53 is constituted of a projector capable of projecting a video at a closest position, and an ultra-short focus projector is used, for example. By using the light source 53 as described above, the entire display apparatus can be significantly downsized, and it becomes possible to structure a compact signage tool, for example.

Heretofore, the embodiments of the present disclosure have been described. However, the present disclosure is not limited to the embodiments above and can of course be variously modified without departing from the gist of the present disclosure.

For example, although the image (virtual image) displayed on the first optical member 111 is constituted of different images on the side surfaces S11 to S14, the present disclosure is not limited thereto, and all of the images may be the same. With this structure, common information can be presented to the periphery of the display apparatus.

Further, in the embodiments above, the first optical member 111 and the second optical member 121 are formed in a square pyramid shape. However, the shape is not limited thereto, and the first optical member 111 and the second optical member 121 may be formed in a triangular pyramid shape, a pentagonal pyramid shape, or other polygonal pyramid shapes.

The first optical member 111 does not need to be formed of a transparent material and may be formed of, for example, a metal material. In this case, a virtual image cannot be displayed on the first optical member, but a reflection image can be displayed with a high luminance.

Furthermore, the embodiments above have taken the display apparatus used in the digital signage as an example. However, the present disclosure is not limited thereto, and since different virtual images can be presented depending on the viewing direction, for example, the present disclosure is also applicable to an entertainment apparatus for games and the like, and a display apparatus that displays route guidance, traffic information, and the like.

It should be noted that the present disclosure may also take the following structures.

(1) A display apparatus, including:
a first display unit including a first screen on which a first image is imaged and that is capable of displaying the first image in a first direction and a first optical member capable of reflecting and displaying the first image in at least one second direction crossing the first direction;
a second display unit that includes a second screen on which a second image is imaged and is capable of displaying the second image in the second direction; and
a light source configured to project first image light forming the first image onto the first screen and project second image light forming the second image onto the second screen.

(2) The display apparatus according to (1) above, further including
a reflection member configured to reflect the second image light projected from the light source toward the second screen.

(3) The display apparatus according to (1) or (2) above,
in which the first optical member is formed of a translucent material, and
in which the light source projects the second image light onto the second screen via the first optical member.

(4) The display apparatus according to any one of (1) to (3) above,
in which the first optical member is formed in a pyramid shape including a first apex portion opposing the first screen in the first direction and a plurality of first side surfaces capable of reflecting and displaying the first image displayed on the first screen in a plurality of second directions.

(5) The display apparatus according to (4) above,
in which the first image includes a plurality of image portions that differ for each of the plurality of first side surfaces, and
in which the plurality of image portions displayed on the first screen are reflected and displayed in the plurality of second directions that differ for each of the plurality of first side surfaces.

(6) The display apparatus according to (5) above,
in which the plurality of image portions include a plurality of image portions obtained when an object is seen from different viewpoints.

(7) The display apparatus according to any one of (1) to (6) above,
in which the second screen is constituted of a transmission-type screen.

(8) The display apparatus according to any one of (4) to (7) above,
in which the first optical member is formed in a hollow shape.

(9) The display apparatus according to any one of (4) to (8) above,
in which the second display unit is formed in a translucent pyramid shape including a second apex portion opposing the first apex portion in the first direction and a plurality of second side surfaces connected to the plurality of first side surfaces, and
in which the second screen is constituted of at least one of the plurality of second side surfaces.

(10) The display apparatus according to any one of (7) to (9) above,
in which the second screen includes a light incident surface that the second image light enters and on which an antireflection film is formed.

(11) The display apparatus according to any one of (1) to (8) above,
in which the second screen is a reflection-type screen, and
in which the second display unit further includes a second optical member capable of reflecting and displaying the second image in the second direction.

(12) The display apparatus according to (11) above,
in which the second optical member is formed in a pyramid shape including an apex portion opposing the second screen and a plurality of side surfaces capable of reflecting and displaying the second image displayed on the second screen in the second direction.

(13) The display apparatus according to any one of (1) to (12) above,
in which the first screen has a screen gain of 5.5 or more.

(14) The display apparatus according to any one of (1) to (13) above,
in which the light source includes a projector.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus, comprising:
a first display unit that includes a first screen and a first optical member, the first screen is configured to display a first image in a first direction, wherein the first optical member has a pyramid shape that includes a first apex portion opposite to the first screen in the first direction and a plurality of first side surfaces;
a second display unit that includes a second screen and a plurality of second side surfaces, wherein the second screen is configured to display a second image in a second direction; and
a light source configured to project a first image light, to display the first image, onto the first screen and project a second image light, to display the second image, onto the second screen;
wherein the first image light is different from the second image light, and
wherein the plurality of first side surfaces of the first optical member and the plurality of second side surfaces of the second display unit are connected to each other.

2. The display apparatus according to claim 1, further comprising
a reflection member configured to reflect the second image light projected from the light source toward the second screen.

3. The display apparatus according to claim 2,
wherein the reflection member comprises a rectangular ring member, and wherein the rectangular ring member comprises four reflection mirrors arranged around the first screen.

4. The display apparatus according to claim 1,
wherein the first optical member includes a translucent material, and
wherein the light source is further configured to project the second image light onto the second screen via the first optical member.

5. The display apparatus according to claim 1,
wherein the plurality of first side surfaces are configured to reflect the first image displayed on the first screen in the second direction.

6. The display apparatus according to claim 5,
wherein the first image includes a plurality of image portions that differ for each of the plurality of first side surfaces, and
wherein the plurality of image portions displayed on the first screen are reflected by the plurality of first side surfaces and are different from each of the plurality of first side surfaces.

7. The display apparatus according to claim 6,
wherein the plurality of image portions include a plurality of image portions obtained in an event an object is seen from different viewpoints.

8. The display apparatus according to claim 1,
wherein the second screen includes a transmission-type screen.

9. The display apparatus according to claim 8,
wherein the second screen further includes a light incident surface, and wherein an antireflection film is on the light incident surface.

10. The display apparatus according to claim 1,
wherein the first optical member has a hollow shape.

11. The display apparatus according to claim 1,
wherein the second display unit has a translucent pyramid shape that includes a second apex portion opposite to the first apex portion in the first direction and
wherein the second screen includes at least one of the plurality of second side surfaces.

12. The display apparatus according to claim 1,
wherein the second screen includes a reflection-type screen, and
wherein the second display unit further includes a second optical member.

13. The display apparatus according to claim 12,
wherein the second optical member has a pyramid shape that includes an apex portion opposite to the second screen and a plurality of third side surfaces, wherein the plurality of third side surfaces are configured to reflect the second image displayed on the second screen in the second direction.

14. The display apparatus according to claim 1,
wherein the first screen has a screen gain of 5.5 or more.

15. The display apparatus according to claim 1,
wherein the light source includes a projector.

16. The display apparatus according to claim 1,
wherein the first direction is orthogonal to the second direction.

17. The display apparatus according to claim 1,
wherein the first optical member is configured to display the first image.

18. The display apparatus according to claim 1,
wherein the first display unit is perpendicular to the first direction and,
wherein the first display unit is a transmission type screen and is configured to display the first image on the plurality of first side surfaces of the first optical member.

19. The display apparatus according to claim 1,
wherein the first image displayed on the first screen is different from the second image displayed on the second screen.

* * * * *